(12) United States Patent
Hars

(10) Patent No.: US 7,325,021 B2
(45) Date of Patent: Jan. 29, 2008

(54) VLSI IMPLEMENTATION OF METASTABILITY-BASED RANDOM NUMBER GENERATOR USING DELAY LADDERS

(75) Inventor: Laszlo Hars, Cranberry Township, PA (US)

(73) Assignee: NXP B.V., Eindhoven (NL)

( * ) Notice: Subject to any disclaimer, the term of this patent is extended or adjusted under 35 U.S.C. 154(b) by 781 days.

(21) Appl. No.: 10/801,768

(22) Filed: Mar. 15, 2004

(65) Prior Publication Data

US 2005/0004959 A1     Jan. 6, 2005

Related U.S. Application Data

(60) Provisional application No. 60/454,837, filed on Mar. 14, 2003.

(51) Int. Cl.
   *G06F 7/58* (2006.01)
(52) U.S. Cl. .................................. 708/250
(58) Field of Classification Search ............. 708/250
   See application file for complete search history.

(56) References Cited

U.S. PATENT DOCUMENTS

| | | | | |
|---|---|---|---|---|
| 6,631,390 | B1* | 10/2003 | Epstein ..................... | 708/250 |
| 6,771,104 | B2* | 8/2004 | Hars ........................ | 327/164 |
| 2004/0264233 | A1* | 12/2004 | Fukushima et al. ......... | 365/145 |
| 2004/0267845 | A1* | 12/2004 | Hars ........................ | 708/250 |
| 2004/0267846 | A1* | 12/2004 | Hars et al. ................. | 708/250 |
| 2005/0004960 | A1* | 1/2005 | Hars ........................ | 708/251 |
| 2005/0004961 | A1* | 1/2005 | Hars ........................ | 708/252 |

\* cited by examiner

*Primary Examiner*—D. H. Malzahn

(57) ABSTRACT

A random number generator includes a chain of pairs of D-type flip-flops 205, 215 ... having D and L inputs, a chain of substantially identical cascaded upper buffers 210, 220 ... each having a predetermined delay $d_1$ and respective output taps. There is a chain of substantially identical cascaded lower buffers 240, 260 ... each having a predetermined delay $d_2$, and respective output taps, wherein $d_1 \ne d_2$. A first one of the pair of D-type flip flops 205 has its D and L inputs connected to a respective output tap of one of the upper buffers 210 and a respective output tap of one of the lower buffers 240, and a second one of the pair of D-type flip flops has its D and L inputs connected to a respective output tap of one of the lower buffers 260 and a respective output of one of the upper buffers 215. The common clock input 201 is connected to the first inputs of both the cascaded upper buffers and the cascaded lower buffers 210, 220 ... and 240, 260 ... A metastability detector 275, 280 285, 290, 295 ... for each individual flip-flop of the chain of flip flops, and a respective metastability detector connected to the Q output of each respective flip-flop. The metastability detectors have a counting feature to count a number of times that each of the respective metastability detector signals a metastable state, and one flip-flop of the pair flip-flops having the most metastable detector states is selected to generate random numbers from its output.

19 Claims, 2 Drawing Sheets

VLSI IMPLEMENTATION OF METASTABILITY-BASED RANDOM NUMBER GENERATOR USING DELAY LADDERS

This application claims priority to Provisional Ser. No. 60/454,837 filed Mar. 14, 2003.

FIELD OF THE INVENTION

The invention relates to the phenomenon of metastability and the effect of metastability on semiconductors. More particularly, the present invention relates to the use of metastability in the field of random number generators by creating a random number generator that makes use of the phenomenon.

BACKGROUND ART

Latches and flip-flops are widely used in all types of electronic devices for counting, sampling, and storage of data. There are a number of different types of flip-flops named after their primary function, such as D-type flip-flops (data), J-K flip flops (J and K inputs), and R-S flip-flops (having R and S latches, standing for "reset: and "set". D flip-flops are a clocked flip-flop having a one clock pulse delay for its output.

Conventional flip-flops, such as D-type, can be used to detect the logic state of an asynchronous digital signal with timing relative to the clock signal that is non-periodic.

For example, as shown in FIG. 1, a synchronous signal can be applied to the clock input (CLK) 105 of flip-flip 110, and a digital logic level of the asynchronous signal (the inverted output —Q of the flip-flop) to be detected is directed to the D input. The output signal is subsequently inverted on the Q output. Afterward, the flip-flop changes state whenever the clock signal is changed, as long as the reset signal is tied permanently to ground.

When there are multiple systems linked together, and the systems operate at different frequencies, it has long been a problem of designers to attempt a synchronization of the systems. It is a well-known way to synchronize such systems by synchronizing one of the signals with a local clock generator, by the use of a flip-flop.

However, the above solution to the synchronization problem is not perfect, as the operating conditions of the flip-flops can be violated because hold times and setup times are not always consistent with the specifications (such as provided in the data sheets) of the flip flops used. The violation of the flip-flops can cause them to go into an unstable (metastable) state that can affect the entire operation of the linked systems. Metastability can occur when both inputs to a latch are set at a logic high (11) and are subsequently set at a logic low (00).

Metastability can cause the latch outputs to oscillate unpredictably in a statistically known manner. While theoretically it is possible for the latch outputs to oscillate in a statistically known manner, in reality the latch will randomly shift and arrive at random output values. Such metastable values are then detected by other circuitry as different logic states.

In circuit design, it is necessary for an engineer to determine what influence metastable states may have in a particular design, and provide ways to overcome the bad effects that metastability could have on a circuit.

It has also been recognized that the output of a metastable flip-flop circuit is sufficiently random. Thus, the instant inventor submits that the randomness of the metastable flip-flop is sufficiently random to build a random number generator.

FIG. 1 also shows a diagram of a flip-flop 109 realized with cross connected NAND gates 108,110. This flip-flop receives its both data inputs from clock oscillator 105 through the clock input 106 of flip-flop 109, which shapes the clock signal to square-wave. The Q output 107 is connected to both of the NAND gates 108, 110 via delay devices, 112,114, respectively. If the two NAND gates 108,110 were truly identical, there would be no need for the delay devices to achieve the highest probability to get the flip-flop 109 to become metastable. However, the NAND gates will ordinarily differ somewhat, and their speed difference will influence the number of times metastability occurs in a time interval.

In VLS integrated circuits there have been attempts at tunable delay by using single tapped-buffer chains, but their implementation has not been practical. The delay resolution was too course for the dynamic fine tuning required to achieve the highest frequencies at which metastability occurs. Delays were also designed by the introduction of long wires of various lengths, which increased design expense and was found to be difficult to control using automatic layout tools and standard element libraries.

SUMMARY OF THE INVENTION

It is an object of the invention to provide a metastable random number generator using dual-tapped buffer ladders. Accordingly a random number generator of the present invention includes a clock, a series of dual-tapped-buffer ladders (also referred to as buffer-chains).

DETAILED EMBODIMENTS

Figure 1:
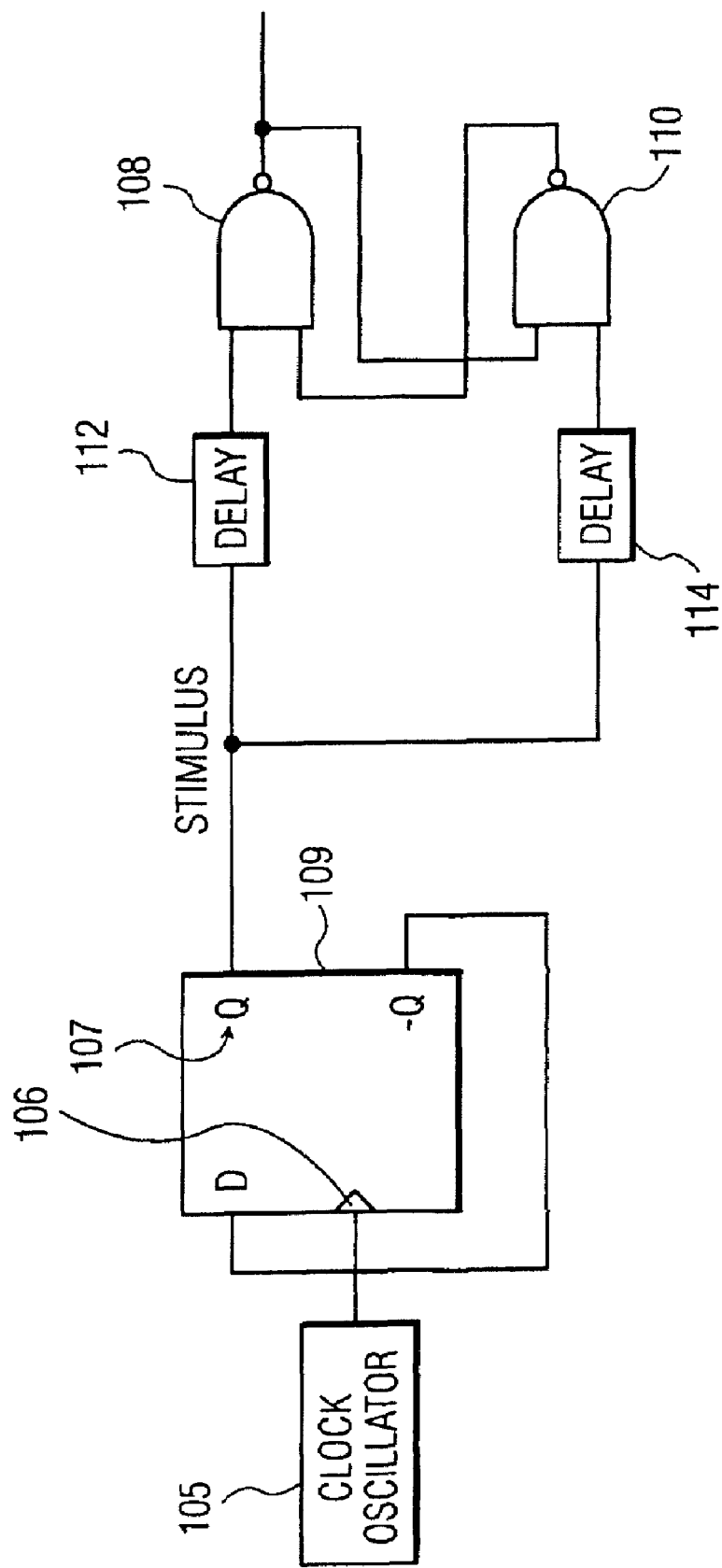
FIG. 1 illustrates a conventional flip-flop with cross-connected Nand gates to be forced into a metastable state.
Figure 2:
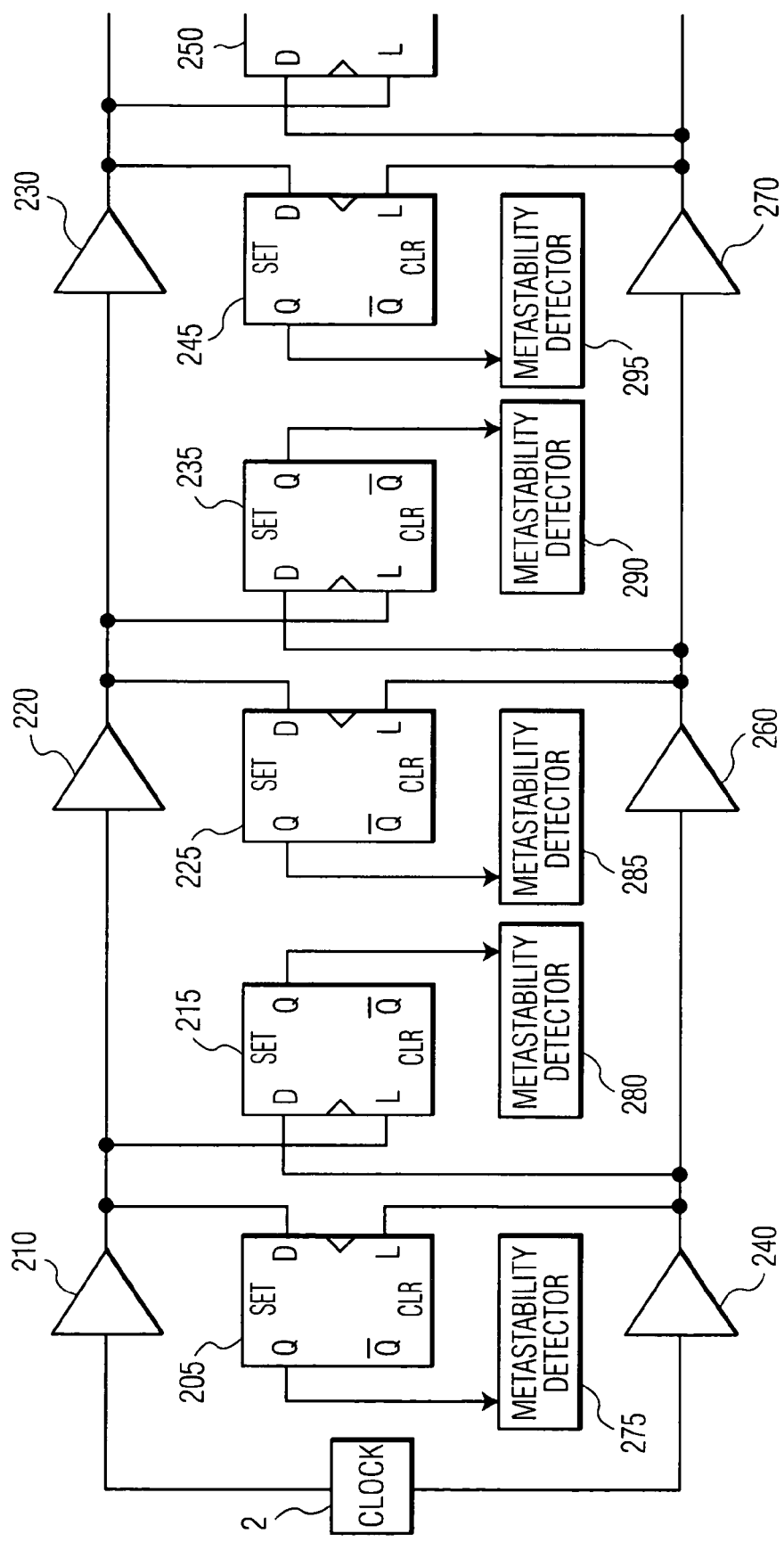
FIG. 2 is an illustration of one way that a dual-tapped buffer chain can be employed.

FIG. 2 illustrates one way that a dual-tapped buffer chain can be arranged according to the present invention. It is understood by persons of ordinary skill in the art that the number of flip-flops shown was selected for explanatory purposes, and there can be different arrangements in terms of size and connectivity that fall within the spirit of the invention and the scope of the appended claims.

As shown in FIG. 2, a series of D-flip flops 205, 215, 225, 235, 245, 255 are connected to a top row of buffers, 210, 220, and 230, and to a bottom row of buffers, 240, 260, and 270. The top row buffers are identical, each with a delay=$d_1$, whereas the bottom row buffers are also identical, each with a delay=$d_2$.

The difference between the delay of the top and bottom row of buffers (d) is equal to:

d=$d_1$–$d_2$, which can be a very small value. The cascading of the flip-flops via the buffers means that, for example, in the center row of flip-flops the signal delay between the D and L inputs is:

d, –d, 2d, –2d, 3d . . . . With an extra flip-flop having its D and L inputs connected directly to the clock signal there can be any desired range of delays from –n*d to +n*d, where n is the number of buffers in the delay ladder.

As also shown in FIG. 2, one flip-flop of each pair has its D and L inputs connected to corresponding taps at the outputs of the buffers, in this particular case wherein the D inputs of flip-flops 205, 225 and 245 are attached to the respective outputs of the top buffers 210, 220 and 230, and the L inputs of flip-flops 205, 225 and 245 are attached to the respective outputs of the bottom buffers 240, 260 and 270. The other flip-flop of each pair of flip-flops connects its D and L inputs reverse of the above, with the D input connected to the respective output of the bottom buffer, and the L input connected to the respective top buffer.

Although not shown in FIG. 2, the flip-flops 215 . . . 250 can have clock inputs (identified as the triangular shape in the flip-flop), that are connected to a signal of constant logic level 1, in order to keep the flip-flop always active. Whenever the signal changes at the data inputs D and L the states of flip-flops might also change, some of them could get metastable.

Each of the flip-flops has metastability detectors (275, 280,285,290,295), which are circuits that describe whether the signal on their input is metastable. In order to generate metastability, the flip-flops can be clocked with an input that deliberately violates the setup or hold times (and possibly both) of the flip-flop to ensure meta-stable behavior. The metastable output will cause the flip-flop to be asynchronous when compared with the clock input. A well-known synchronizing circuit can be used to synchronize the metastable output of the flip-flop with the clock source. After this synchronization, the flip-flop output is compared by the metastability detector to an input wave to ascertain whether the input and the output of the flip-flop do not match, indicating that the flip flop is in a metastable state. U.S. patent application Philips disclosure 700720 filed Mar. 6, 2000 is hereby incorporated by reference as background material regarding the provision of background information about the function of the metastability detectors.

The items illustrated in FIG. 2 are the front end of a random number generator. The last part of the circuit communicates with the metastability detectors to determine which circuit becomes the most metastable. The flip-flop having the highest count of metastability occurrences is chosen to generate random numbers from its output. This feature may be periodically revisited after a predetermined period of time, amount of numbers generated, etc. to ensure that there hasn't been a change in the flip-flop showing the most metastability.

Moreover, as the frequency of the matastability occurrences is changed, the counters/comparators can be reset (or this can be a periodic function) to find the flip-flop having the most current highest metastable count. In any case, the output of the selected flip-flop is used to generate random numbers.

Each of the flip-flops has metastability detectors (275, 280,285,290,295), which are circuits that describe whether the signal on their input is metastable. In order to generate metastability, the flip-flops can be clocked with an input that deliberately violates the setup or hold times (and possibly both) of the flip-flop to ensure meta-stable behavior. The metastable output will cause the flip-flop to be asynchronous when compared with the clock input. A well-known synchronizing circuit can be used to synchronize the metastable output of the flip-flop with the clock source. After this synchronization, the flip-flop output is compared by the metastability detector to an input wave to ascertain whether the input and the output of the flip-flop do not match, indicating that the flip flop is in a metastable state. U.S. patent application Ser. No. 09/519,549, filed Mar. 6, 2000, now issued U.S. Pat. No. 6,631,390, is hereby incorporated by reference as background material regarding the provision of background information about the function of the metastability detectors.

Finally, it should understood by persons of ordinary skill in the art that one particular use of the presently claimed invention could be a smart card, which may or may not be used for CD, DVD, solid state memory players, or perhaps encryption for making purchases, by having a random number generator according to the present invention embedded thereon. In addition, the metastability state flip-flops has the advantage of preventing one from trying to steal information from the smart card by measuring voltage fluctuations to obtain passwords, etc.

Thus, the two chains of buffers provide fine delay adjustments to reach metastable states. Since the two chains use buffers with slightly different delays, the delay difference between corresponding buffer outputs changes gradually along the ladder, providing high resolution in the relative delays of the two data signals. Thus, the most metastable flip-flop is ideally used to generate the random numbers in a best mode of the invention, although it is possible to use another of the flip-flops in the ladder if desired.

In addition, while D-type flip flops were used in this application, it is possible to use other types of flip-flops that can reach a metastable state by using data signals changing when violating their hold and setup times.

What is claimed is:

1. A dual-tapped buffer ladder comprising:
   a pair of D-type flip flops having D and L inputs;
   a plurality of cascaded upper buffers having a predetermined delay $d_1$ and respective output taps;
   a plurality of cascaded lower buffers having a predetermined delay $d_2$, and respective output taps, wherein $d_1 \neq d_2$;
   a first one of the pair of D-type flip flops having its D and L inputs connected to a respective output tap of the upper buffer and a respective output tap of the lower buffer;
   a second one of the pair of D-type flip flops having its D and L inputs connected to a respective output tap of one of the lower buffers and a respective output of one of the upper buffers;
   a common clock input connected to an input of the first buffers of both the plurality of cascaded upper buffers and the plurality of cascaded lower buffers;
   wherein a delay difference between the cascaded upper buffers $n*d_1$ and cascaded lower buffers $n*d_2$ changes along different positions of the ladder circuit.

2. The dual-tapped buffer ladder according to claim 1, further comprising:
   more than one pair of D-type flip flops being arranged in a ladder arrangement; and
   a number of respective cascaded upper buffers and cascaded lower buffers corresponds to a number of D-type flip flops.

3. A random number generator comprising:
   pairs of D-type flip-flops having D and L inputs;
   cascaded upper buffers having a predetermined delay $d_1$ and respective output taps;
   cascaded lower buffers having a predetermined delay $d_2$, and respective output taps, wherein $d_1 \neq d_2$;
   a first one of the pair of D-type flip flops having its D and L inputs connected to a respective output tap of one of the cascaded upper buffers and a respective output tap of one of the cascaded lower buffers;

a second one of the pair of D-type flip flops having its D and L inputs connected to a respective output tap of one of the lower buffers and a respective output of one of the upper buffers a common clock input connected to an input of the first one of both the cascaded upper buffers and the cascaded lower buffers;

a metastability detector for each individual flip-flop, a respective metastability detector connected to the Q output of each respective flip-flop;

said metastability detectors having a counting feature to count a number of times that each of the respective metastability detector signals a metastable state;

wherein one flip-flop of the pair flip-flops is selected to generate random numbers from its output.

4. The random number generator according to claim 3, wherein a delay difference between the cascaded upper buffers of individual delay $d_1$ and cascaded lower buffers of individual delay $d_2$ changes along different positions of the ladder circuit.

5. The random number generator according to claim 3, wherein data change respective to a clock at time points selected to violate setup and hold times of particular flip-flops being used.

6. The random number generator according to claim 3, wherein the flip-flop having the highest metastable count is selected as the source of the random number generator.

7. The random number generator according to claim 6, wherein periodically the counters of the metastability detector are reset so that a flip-flop having the most recent highest number of metastable events is selected for random number generation.

8. The random number generator according to claim 6, wherein the counters of the metastability detector are reset each time the frequency of the metastable events of the selected flip-flop changes.

9. A smart card having the random number generator according to claim 6.

10. The random number generator according to claim 6, wherein the delays $d_1$ and $d_2$ determine the number of pairs of flip-flops in the ladder arrangement to assure continuous functioning regardless of environmental changes.

11. A method for providing a dual-tapped buffer ladder comprising:
(a) providing a pair of D-type flip flops having D and L inputs;
(b) connecting a sequence of substantially identical cascaded upper buffers having a predetermined delay $d_1$ and respective output taps to one of the D and L inputs of the pair of D-type flip-flops;
(c) connecting a sequence of substantially identical cascaded lower buffers having a predetermined delay $d_2$, and respective output taps to the other of the D and L inputs connected in step (b), wherein $d_1 \neq d_2$;
(d) connecting a common clock input to the first inputs of both the cascaded upper buffers and the cascaded lower buffers;

wherein a delay difference between the cascaded upper buffers of individual delay $d_1$ and cascaded lower buffers of individual delay $d_2$ changes along different positions of the ladder circuit.

12. The method of claim 11, further comprising:
connecting more than one pair of D-type flip flops in a ladder arrangement; and
connecting a number of respective cascaded upper buffers and cascaded lower buffers to correspond to a number of D-type flip flops.

13. A method for random number generation comprising:
(a) providing a pair of D-type flip flops having D and L inputs;
(b) connecting substantially identical cascaded upper buffers each having a predetermined delay $d_1$ and respective output taps to one of the D and L inputs of the pair of D-type flip-flops;
(c) connecting substantially identical cascaded lower buffers each having a predetermined delay $d_2$, and respective output taps to the other one of the D and L inputs of the pair of D-type flip-flops, wherein $d_1 \neq d_2$;
(d) connecting a common clock to the first inputs of both of the cascaded upper buffers and the cascaded lower buffers;
(e) providing a metastability detector for each individual flip-flop of the pair of flip flops, a respective metastability detector connected to the Q output of each respective flip-flop;
(f) said metastability detectors counting a number of times that each of the respective metastability detector signals a metastable state; and
(g) selecting one flip-flop of the pair flip-flops to generate random numbers from its output.

14. The method according to claim 13, wherein the flip-flop selected in step (g) has the highest metastable count.

15. The method according to claim 14, wherein the difference of delays $d_1$ and $d_2$ corresponds to the number of pairs of flip-flops in the ladder arrangement.

16. The method according to claim 14, further comprising (h) periodically resetting counts of the metastability detector according to predetermined criteria and returning to step (g).

17. The method according to claim 16, wherein the predetermined criteria used to reset the counts comprises changing of the frequency of the metastable events of the selected flip-flop.

18. The method according to claim 13, wherein a delay difference between the cascaded upper buffers and cascaded lower buffers is variable by changing the position where flip-flops are connected to a ladder arrangement of buffers.

19. The method according to claim 13, wherein data signals connected in step (c) have delay values selected to violate setup and hold times of particular flip-flops being used.

* * * * *